(12) United States Patent
Zuba

(10) Patent No.: US 7,330,115 B1
(45) Date of Patent: Feb. 12, 2008

(54) ELECTRONIC DEVICE CONTROL SYSTEM

(76) Inventor: John P. Zuba, 2522 W. 32nd St., Erie, PA (US) 16506

( * ) Notice: Subject to any disclaimer, the term of this patent is extended or adjusted under 35 U.S.C. 154(b) by 346 days.

(21) Appl. No.: 11/060,166

(22) Filed: Feb. 18, 2005

(51) Int. Cl.
G08B 13/00 (2006.01)
F21V 33/00 (2006.01)
F21V 23/04 (2006.01)

(52) U.S. Cl. .................. 340/565; 340/693.6; 340/541; 340/545.3; 362/85; 362/394

(58) Field of Classification Search ................ 340/565, 340/693.5, 693.6, 693.9, 693.12, 541, 545.3, 340/551, 552, 567; 315/359; 362/85, 194, 362/394
See application file for complete search history.

(56) References Cited

U.S. PATENT DOCUMENTS

| | | | |
|---|---|---|---|
| 4,319,228 A * | 3/1982 | Daniels | 340/521 |
| 4,510,488 A | 4/1985 | St. Jean et al. | |
| 4,703,171 A | 10/1987 | Kahl et al. | |
| 5,015,944 A | 5/1991 | Bubash | |
| 5,045,833 A * | 9/1991 | Smith | 340/332 |
| 5,128,654 A | 7/1992 | Griffin et al. | |
| 5,349,330 A * | 9/1994 | Diong et al. | 340/567 |
| 5,457,442 A * | 10/1995 | Lucero | 340/693.1 |
| D363,891 S | 11/1995 | Gough | |
| 5,652,568 A | 7/1997 | Kimura et al. | |
| 5,673,022 A * | 9/1997 | Patel | 340/565 |
| 5,867,099 A * | 2/1999 | Keeter | 340/567 |
| 6,091,200 A * | 7/2000 | Lenz | 315/159 |
| 6,320,506 B1 * | 11/2001 | Ferraro | 340/568.1 |
| 6,956,493 B1 * | 10/2005 | Youngblood | 340/693.9 |
| 7,005,802 B2 * | 2/2006 | Myron et al. | 315/56 |

* cited by examiner

Primary Examiner—Toan N. Pham

(57) ABSTRACT

An electronic device control system includes a base unit that includes a housing. A power input and a power output are each mounted in the housing and are electrically coupled to each other. The power input comprises a male plug and the power output comprising a female plug. A processor is electrically coupled to the power input and the power output. The processor is adapted for selectively turning on electrical power from the power input to the power output. A primary motion detector is mounted on an outer surface of the housing and is electrically coupled to the processor. The primary motion detector is adapted for sending a motion signal to the processor when the motion detector detects motion. The processor turns on power to the power output when the processor receives the motion signal.

10 Claims, 5 Drawing Sheets

ELECTRONIC DEVICE CONTROL SYSTEM

BACKGROUND OF THE INVENTION

1. Field of the Invention

The present invention relates to lighting control systems and more particularly pertains to a new lighting control system for allowing a person to turn on an electric appliance by means of motion detectors. While more generally used for light fixtures and lamps, the current system may also be used for turning on televisions, stereo systems and other types of electronic devices.

2. Description of the Prior Art

The use of lighting control systems is known in the prior art. U.S. Pat. No. 4,703,171 describes an infrared detection device which may be hardwired to a lighting system of a dwelling, either outside or inside, for illuminating the dwelling when motion is detected by the device. A similar device is found in U.S. Pat. No. 4,510,488 which includes a infrared intruder detection device which is designed to resemble a conventional outlet in order to deceive an intruder as to its function. Yet another such device is found in U.S. Pat. No. 5,128,654 which includes infrared sensors for controlling light.

While these devices fulfill their respective, particular objectives and requirements, the need remains for a device that allows a person to power any selected electrical appliance with a motion sensor to ensure that those devices are only powered when motion, particularly in the form of heat, is detected. This will allow the device to be used both for saving electricity and as a deterrent to intruders. Additionally, the device should include remote sensors to ensure that the device is not hindered or blocked by furniture or walls.

SUMMARY OF THE INVENTION

The present invention meets the needs presented above by comprising a base unit that includes a housing. A power input and a power output are each mounted in the housing and are electrically coupled to each other. The power input comprises a male plug and the power output comprising a female plug. A processor is electrically coupled to the power input and the power output. The processor is adapted for selectively turning on electrical power from the power input to the power output. A primary motion detector is mounted on an outer surface of the housing and is electrically coupled to the processor. The primary motion detector is adapted for sending a motion signal to the processor when the motion detector detects motion. The processor turns on power to the power output when the processor receives the motion signal.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
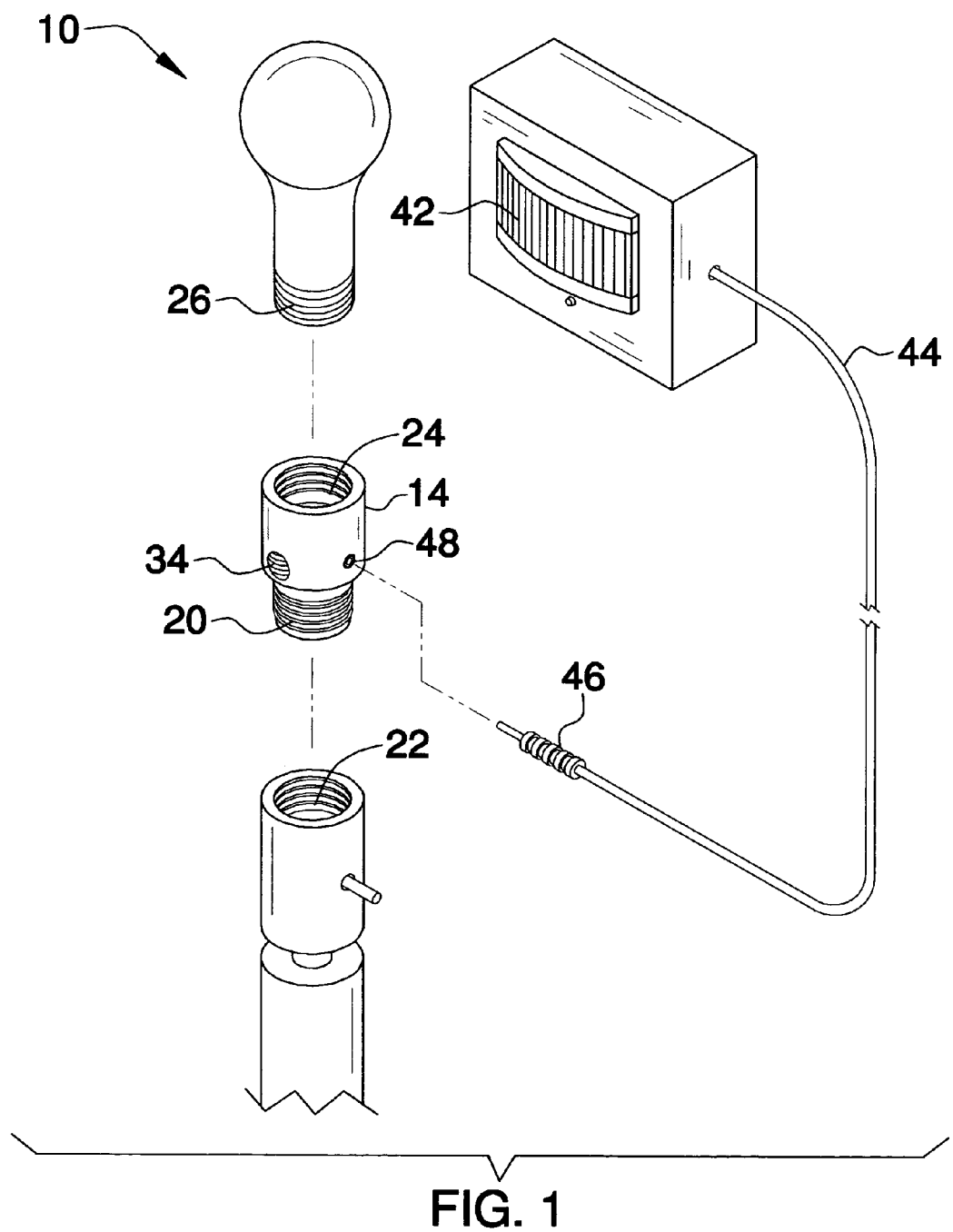
FIG. 1 is a perspective in-use view of a first embodiment of an electronic device control system according to the present invention.
Figure 2:
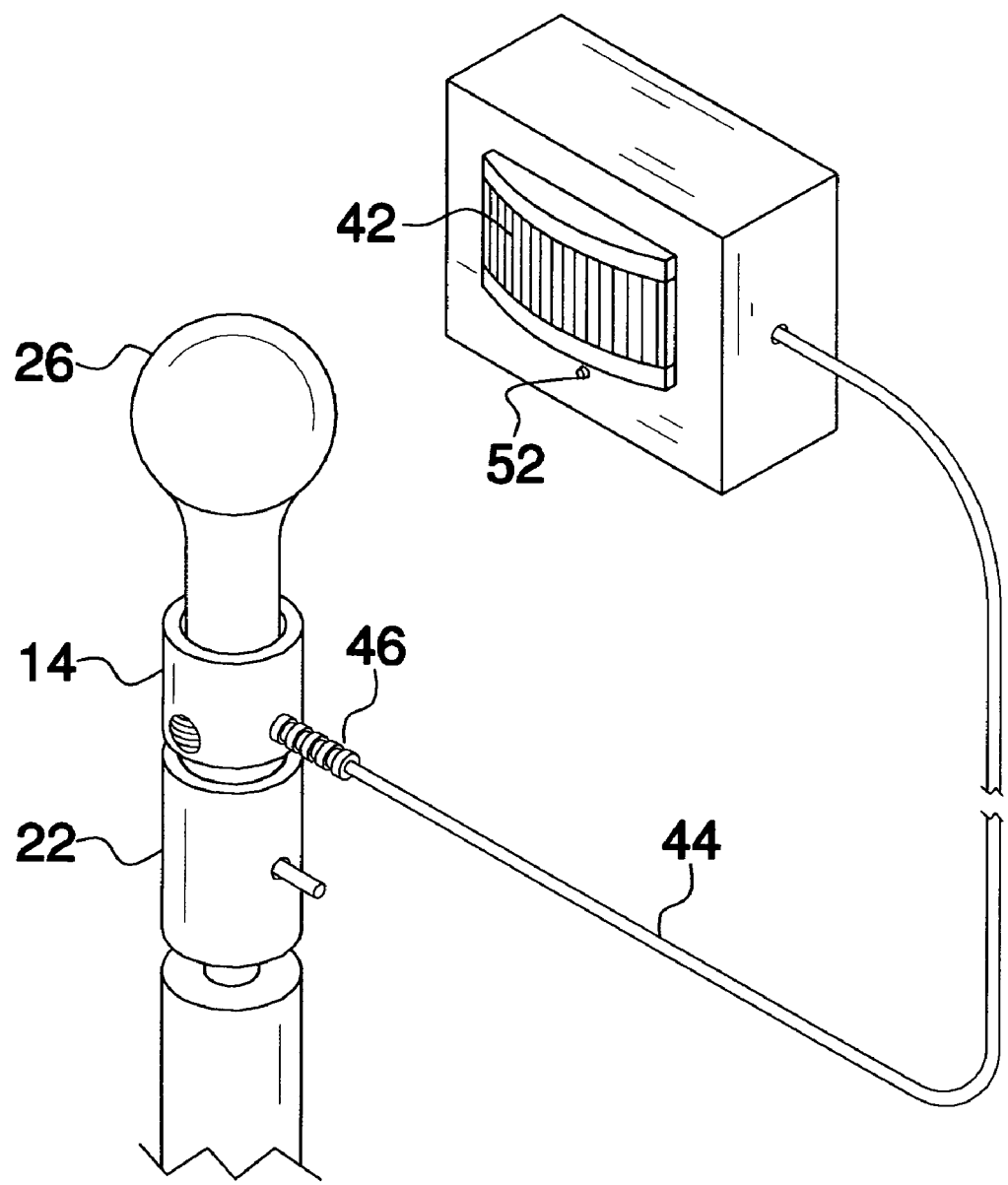
FIG. 2 is a perspective view of the first embodiment the present invention.
Figure 3:
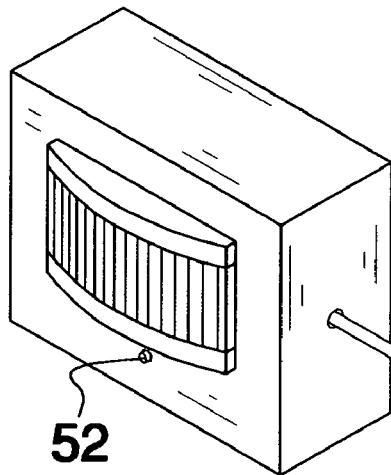
FIG. 3 is a front perspective view of a second embodiment of the present invention.
Figure 4:
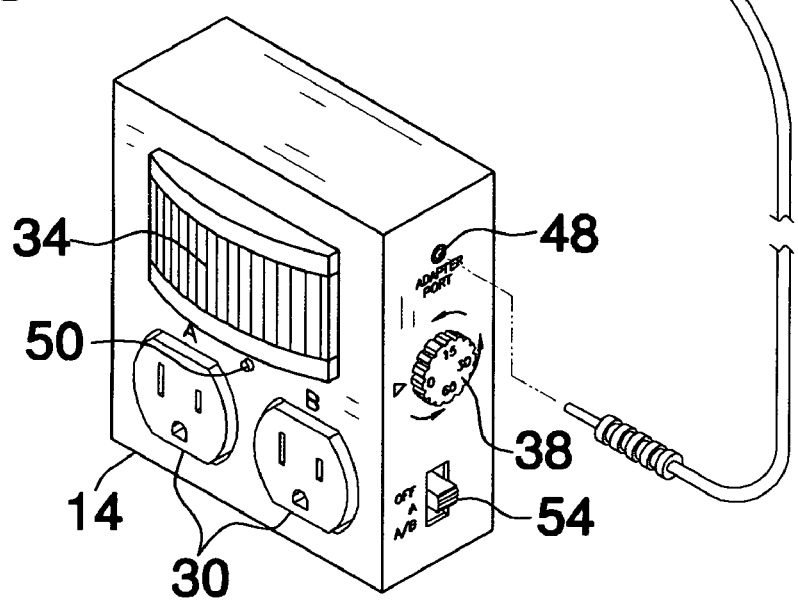
FIG. 4 is a rear perspective view of the second embodiment of the present invention.
Figure 4:
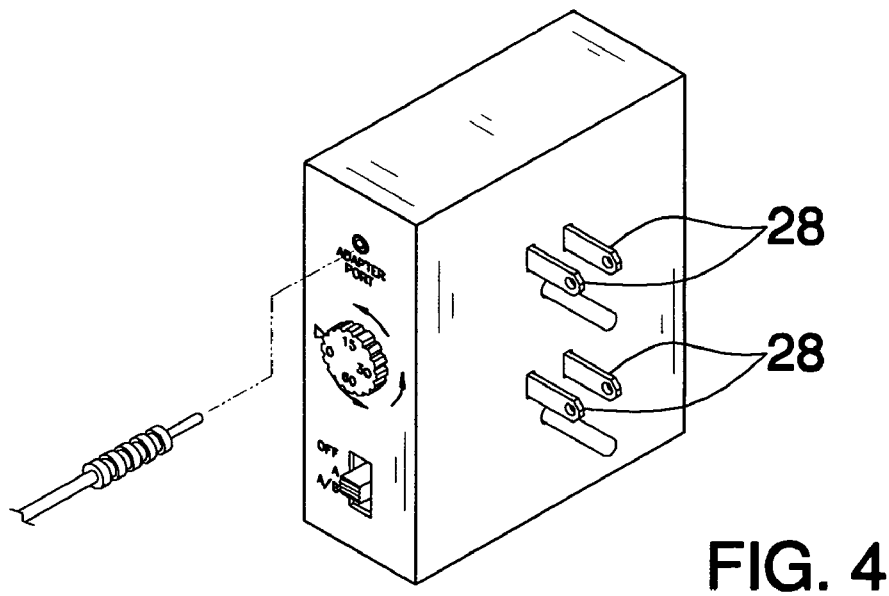
Figure 5:
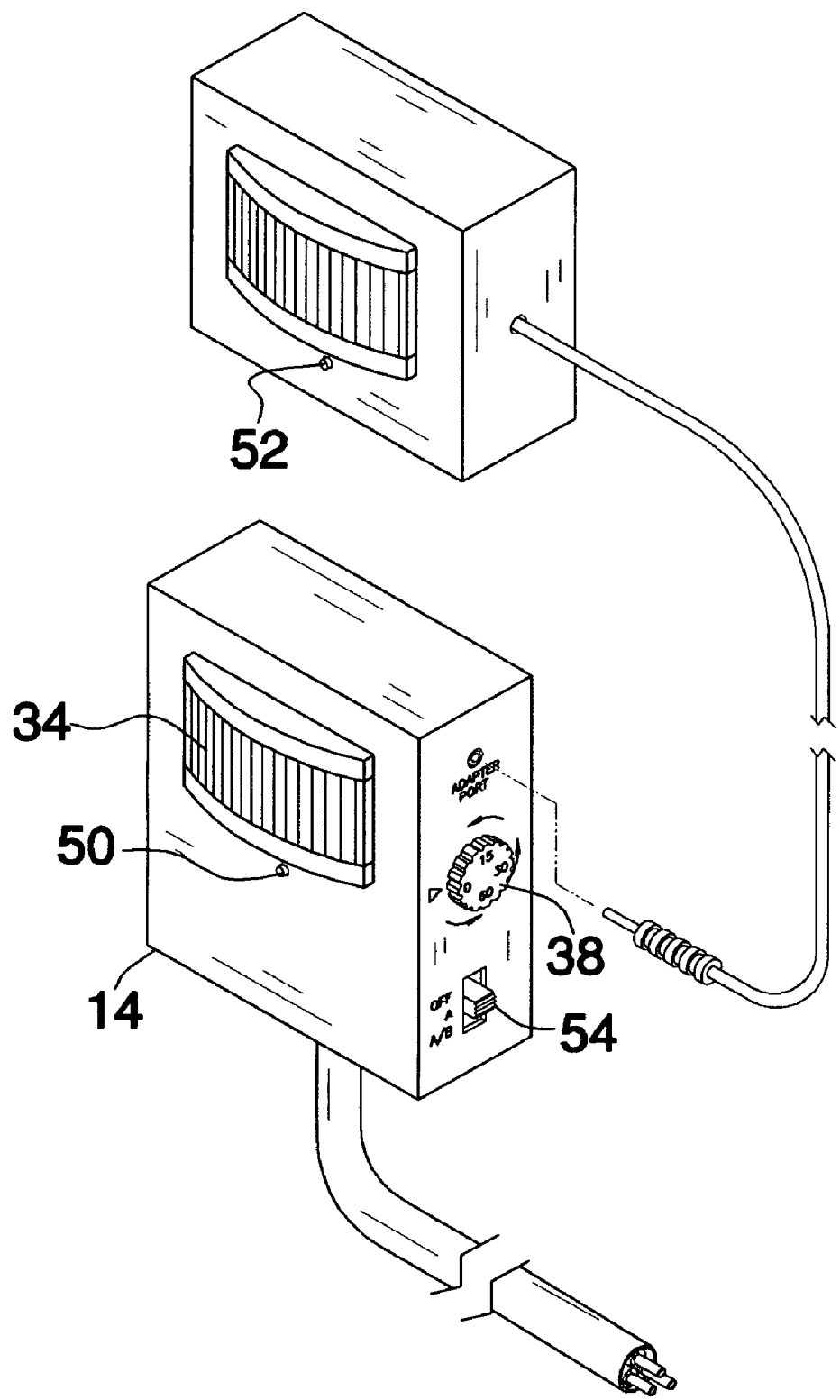
FIG. 5 is a front perspective view of a third embodiment of the present invention.
Figure 6:
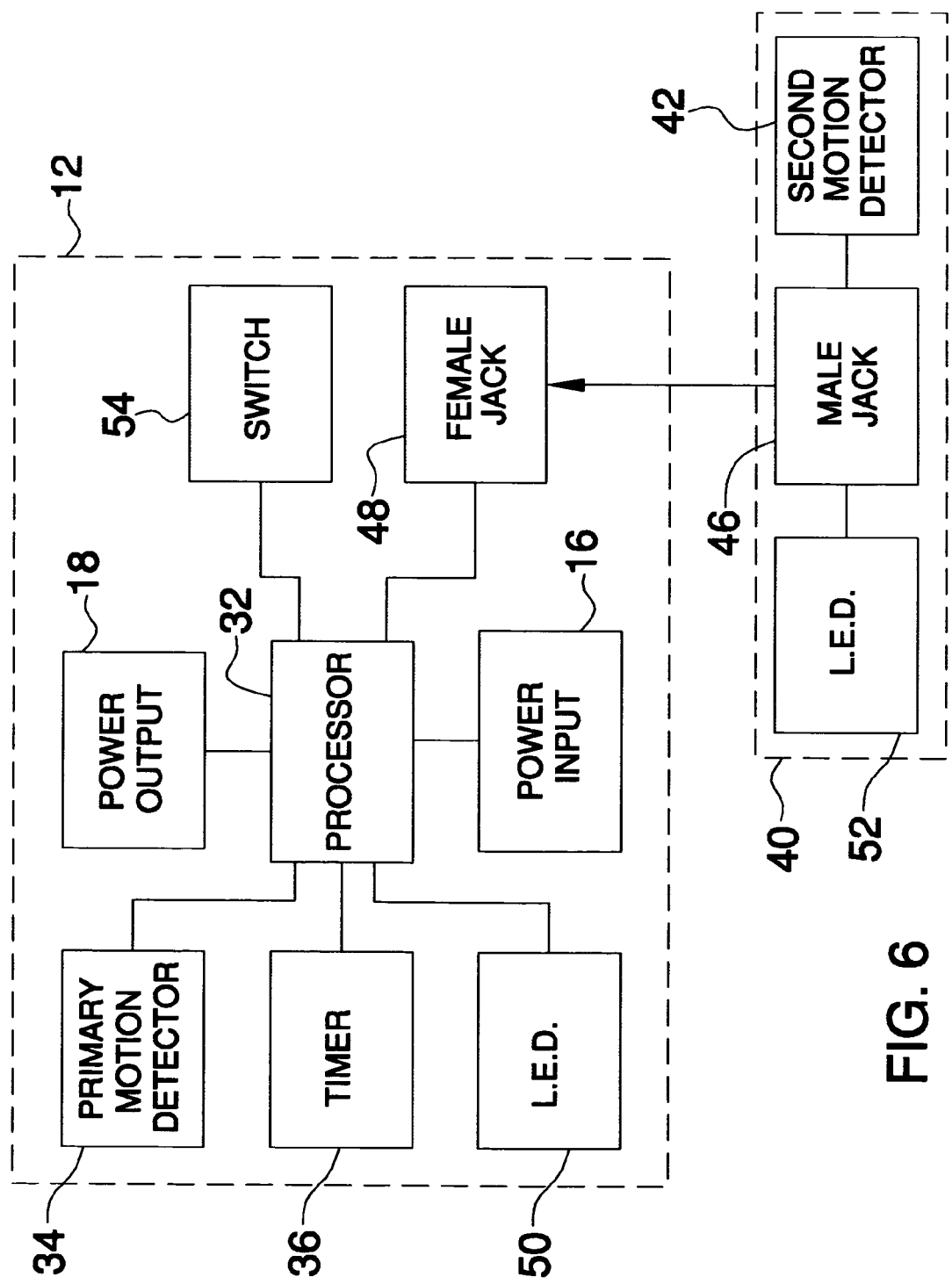
FIG. 6 is a schematic view of the present invention.

With reference now to the drawings, and in particular to FIGS. 1 through 6 thereof, a new lighting control system embodying the principles and concepts of the present invention and generally designated by the reference numeral 10 will be described.

As best illustrated in FIGS. 1 through 6, the electronic device control system 10 generally comprises a base unit 12 that includes a housing 14. A power input 16 and a power output 18 are mounted in the housing 14 and are electrically coupled to each other. The power input 16 comprises a male plug extending outwardly of the housing 12. The power output 18 comprises a female plug. A first embodiment, shown in FIGS. 1 and 2, includes a male plug that comprises a male threaded plug 20 adapted for being extendable into and threadably coupled to a light bulb socket 22. The female plug comprises a threaded female socket 24 adapted for receiving a threaded plug of a light bulb 26. The male plug, or power input 16, may be inserted into a light bulb socket 22 and a light bulb 26 inserted into the female plug, or power outlet 18, such that the light bulb 26 is in electrical communication with the light bulb socket 22. A second embodiment, shown in FIGS. 3 and 4, includes a male plug that comprises at least two conventional prongs 28 and a female plug that comprises a female socket 30 adapted for receiving a male plug having two or three prongs. While the first embodiment is used generally for being attached to a lamp or light fixture, the second embodiment is generally well suited for being plugged into a conventional electrical wall outlet. A third embodiment, shown in FIG. 5, utilizes inputs and outputs that may be directly hardwired to an electrical appliance.

The base unit 12 includes a processor 32 mounted within the housing 14 which is electrically coupled to the power input 16 and the power output 18. The processor 32 is adapted for selectively turning on electrical power from the power input 16 to the power output 18. Likewise, the processor 32 can selectively turn off the electrical power from the power input 16 to the power output 18. A primary motion detector 34 is mounted on an outer surface of the housing 14 and is electrically coupled to the processor 32. The primary motion detector 34 is adapted for sending a motion signal to the processor 32 when the primary motion detector 34 detects motion. The processor 32 turns on power to the power output 18 when the processor 32 receives the motion signal. A timer 36 is operationally coupled to the processor 32. The processor 32 turns off power to the power output 18 when a selected amount of time has elapsed and motion has not been detected during the selected amount of time. The selected amount of time is preferably at least one minute. The selected amount of time restarts each time the processor 32 receives a motion signal. The timer 36 preferably includes a time selector 38 operationally coupled to the processor 32 for selecting the selected amount of time. Alternatively, the processor 32 may be programmed for not restarting the timer 36. Such a feature would be primarily useful where a time selector 38 is provided so that a user of the system 10 may specify a fixed amount of time for which an electric appliance is turned on.

A remote unit 40 may also be used for selectively actuating the processor 32. The remote unit 40 includes a secondary motion detector 42 and a conduit 44 that is electrically coupled to the secondary motion detector 42. The conduit 44 has a free end and a length greater than one foot. A male jack 46 is electrically coupled to the free end. A female jack 48 is electrically coupled to the processor 32. The male jack 46 is selectively extendable into and couplable to the female jack 48. The conduit 44 is sends a motion signal from the secondary motion detector 42 to the processor 32 so that the processor 32 turns on power to the power output 18. The remote unit 40 is particularly useful where a lamp shade or piece of furniture obstructs the primary motion detector 34. The primary 34 and secondary 42 motion detectors are conventional and preferably are adapted for detecting infrared radiation.

Light emitters 50, 52 are mounted on and electrically coupled, respectively, to the base unit 12 and to the remote unit 40. The light emitters 50, 52 are preferably light emitting diodes. The light emitter 50 on the base unit 12 is electrically coupled directly to the processor 32 while the light emitter on the remote unit is electrically coupled to the processor 32 via the conduit 44 so that the light emitters 50, 52 are illuminated when the processor 32 is receiving power from the power input 16.

A switch 54 may be mounted on the second embodiment and electrically coupled to the processor 32 for engaging or disengaging the primary motion sensor 34. Additionally, if the base unit 12 of the second embodiment includes a pair of female sockets 30, the switch 54 may be a three-way switch for selecting if only one, both or neither of the female sockets 30 is operationally coupled to the primary 34 and secondary 42 motion sensors.

In use, the system 10 is electrically coupled to a lamp, as shown in FIG. 1, or an electrical applicant may be plugged into the system, as would be the case with the second embodiment. Electricity will flow to the light bulb 26 or to the appliance only when motion is detected. The remote unit 40 allows a person the freedom of positioning the secondary motion detector 42 as needed to ensure that the processor 32 turns on electrical power to the power output 18.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A motion activated electrical power supplying assembly comprising:
    a base unit including;
        a housing;
        a power input and a power output each mounted in said housing and being electrically coupled to each other, said power input comprising a male plug and said power output comprising a female plug;
        a processor being electrically coupled to said power input and said power output, said processor being adapted for selectively turning on electrical power from said power input to said power output;
        a primary motion detector being mounted on an outer surface of said housing and being electrically coupled to said processor, said primary motion detector being adapted for sending a motion signal to said processor when said motion detector detects motion, said processor turning on power to said power output when said primary processor receives said motion signal;
    a remote unit for selectively actuating said processor including;
        a secondary motion detector;
        a conduit being electrically coupled to said secondary motion detector, said conduit having a free end, a male jack being electrically coupled to said free end; and
        a female jack being electrically coupled to said processor, said male jack being selectively extendable into and couplable to said female jack, said conduit being adapted for sending a motion signal from said secondary motion detector to said processor such that said processor turns on power to said power output.

2. The assembly according to claim 1, wherein said male plug comprises a male threaded plug adapted for being extendable into and threadably coupled to a light bulb socket, said female plug comprising a threaded female socket adapted for receiving a threaded plug of a light bulb, wherein said male plug may be inserted into a light bulb socket and a light bulb inserted into said female plug such that said light bulb is in electrical communication with said light bulb socket.

3. The assembly according to claim 2, wherein said base unit further includes a timer being operationally coupled to said processor, said processor turning off power to said power output when a selected amount of time has elapsed and motion has not been detected during the selected amount of time, said selected amount of time restarting each time said processor receives a motion signal.

4. The assembly according to claim 3, wherein said timer includes a time selector operationally coupled to the processor for selecting said selected amount of time.

5. The assembly according to claim 2, wherein said male plug comprises at least two prongs and said female plug comprises a female socket adapted for receiving a male plug having two or three prongs.

6. The assembly according to claim 5, wherein said base unit further includes a timer being operationally coupled to said processor, said processor turning off power to said power output when a selected amount of time has elapsed and motion has not been detected during the selected amount of time, said selected amount of time restarting each time said processor receives a motion signal.

7. The assembly according to claim 6, wherein said timer includes a time selector operationally coupled to the processor for selecting said selected amount of time.

8. The assembly according to claim 1, wherein said base unit further includes a timer being operationally coupled to said processor, said processor turning off power to said power output when a selected amount of time has elapsed and motion has not been detected during the selected amount of time, said selected amount of time restarting each time said processor receives a motion signal.

9. The assembly according to claim 8, wherein said timer includes a time selector operationally coupled to the processor for selecting said selected amount of time.

10. A motion activated electrical power supplying assembly comprising:
- a base unit including;
  - a housing;
  - a power input and a power output each mounted in said housing and being electrically coupled to each other, said power input comprising a male plug and said power output comprising a female plug, said male plug comprising a male threaded plug adapted for being extendable into and threadably coupled to a light bulb socket, said female plug comprising a threaded female socket adapted for receiving a threaded plug of a light bulb, wherein said male plug may be inserted into a light bulb socket and a light bulb inserted into said female plug such that said light bulb is in electrical communication with said light bulb socket;
  - a processor being electrically coupled to said power input and said power output, said processor being adapted for selectively turning on electrical power from said power input to said power output;
  - a primary motion detector being mounted on an outer surface of said housing and being electrically coupled to said processor, said primary motion detector being adapted for sending a motion signal to said processor when said primary motion detector detects motion, said processor turning on power to said power output when said processor receives said motion signal;
  - a timer being operationally coupled to said processor, said processor turning off power in said power output when a selected amount of time has elapsed and motion has not been detected during the selected amount of time, said selected amount of time restarting each time said processor receives a motion signal, said timer including a time selector operationally coupled to the processor for selecting said selected amount of time;
- a remote unit for selectively actuating said processor including;
- a secondary motion detector;
- a conduit being electrically coupled to said secondary motion detector, said conduit having a free end, a male jack being electrically coupled to said free end; and
- a female jack being electrically coupled to said processor, said male jack being selectively extendable into and couplable to said female jack, said conduit being adapted for sending a motion signal from said secondary motion detector to said processor such that said processor turns on power to said power output.

\* \* \* \* \*